(12) United States Patent
Hanson

(10) Patent No.: US 6,795,962 B1
(45) Date of Patent: Sep. 21, 2004

(54) MACHINE INDEPENDENT DEBUGGER

(75) Inventor: David R. Hanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/475,805

(22) Filed: Dec. 30, 1999

(51) Int. Cl.$^7$ .................................................. G06F 9/44
(52) U.S. Cl. ....................... 717/129; 717/124; 717/127
(58) Field of Search ................................ 717/124, 127, 717/129, 147

(56) References Cited

U.S. PATENT DOCUMENTS

| | | | | |
|---|---|---|---|---|
| 5,093,914 A | * | 3/1992 | Coplien et al. | 717/129 |
| 5,317,740 A | * | 5/1994 | Sites | 717/129 |
| 5,555,419 A | * | 9/1996 | Arsenault | 717/136 |
| 5,659,753 A | * | 8/1997 | Murphy et al. | 717/147 |
| 5,781,778 A | * | 7/1998 | Meier et al. | 717/127 |
| 5,848,274 A | * | 12/1998 | Hamby et al. | 717/153 |
| 6,151,701 A | * | 11/2000 | Humphreys et al. | 717/130 |

OTHER PUBLICATIONS

D. R. Hanson, M. Raghavachari, "A Machine–Independent Debugger", 1996, Software–Practice and Experience, vol. 26(11), 1277–1299.*

N. Ramsey, D. R. Hanson, "A Retargetable Debugger", 1992, ACM, p. 22–31.*

* cited by examiner

*Primary Examiner*—Todd Ingberg
*Assistant Examiner*—Qamrun Nahar
(74) *Attorney, Agent, or Firm*—Merchant & Gould

(57) ABSTRACT

The present invention teaches a source-level debugger that defines symbol tables with a grammar. A grammar interface component is used by the compiler to automate portions of the debugger to construct and write the symbol table in a grammar thus simplifying the compiler. The grammar interface component is used by the debugger during execution of the target to read and decode the symbol table, thus simplifying the debugger. Using a grammar to specify the symbol table also documents the symbol table concisely and emphasizes that symbol tables are data structures, not file formats. Many of the pitfalls of working with low-level file formats can be avoided by focusing instead on grammar-based high-level data structures and automating the implementation details.

Management of breakpoints is divided by splitting the nub into a client nub that is local to the target, a server nub that is local to the debugger. The management of breakpoints is localized to the client nub, thus saving communication time between the client nub and the server nub in support of breakpoint processing.

8 Claims, 11 Drawing Sheets

_NUB_BPFLAGS:

| | | |
|---|---|---|
| 0 | 0 | ─1110 |
| 1 | 0 | ─1120 |
| | . | |
| | . | |
| | . | |
| 16 | 0 | ─1130 |
| 17 | 0 | ─1140 |

MACHINE INDEPENDENT DEBUGGER

FIELD OF THE INVENTION

This invention relates generally to source-code debuggers, and more particularly to the composition of symbol tables and management of breakpoints.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Microsoft Corporation, All Rights Reserved.

BACKGROUND OF THE INVENTION

Computer program debuggers are used by programmers to find problems that occur during the execution of a program. Debuggers can be used to control the execution of a program using breakpoints to stop execution of the program at desired points. This allows the programmer to examine variables and a call stack during execution in such a manner that the user of the debugger can view snapshots of the execution of a program and determine if the program is behaving as expected. Users of debuggers can also browse source files, set breakpoints, watch variables, and examine data structures.

Symbol tables, also known as debugging tables, are used by program debuggers to provide detailed information during the execution of the program. A symbol table is generated or emitted by the compiler and linker when the program source code is compiled and linked. Symbol tables are associated with a file that contains the generated executable code of the program. The symbol table maps source statements to byte addresses of executable instructions, which provide guidance in setting breakpoints and examining data during execution. More specifically, debugger symbol tables contain information describing the source code, such as line numbers, the types and scopes of variables, and function names, parameters, function scopes and name/attribute bindings specified by the declarations in a program. Debugger symbol tables also contain information describing the generated executable code. The symbol table enables the debuggers to map source-level variables and data structures to a specific location in the memory of the program being debugged. Debugger symbol tables are not the same as a symbol table that is used internally by the compiler during compilation.

Conventionally, debuggers have been considered notoriously machine-dependent programs. Many conventional debuggers, such as the GNU debugger, gdb, described in R. M. Stallman and R. H. Pesch, 'Using GDB: A guide to the GNU source-level debugger, GDB version 4.0', *Technical Report*, Free Software Foundation, Cambridge, Mass., Jul. 1991, do indeed depend heavily on a specific operating system or on a specific platform or compiler. In conventional debuggers, symbol tables are encoded ad-hoc, in which the information in the symbol table is machine-dependent, in which at least a portion of the information in the symbol table is unique to, or characteristic of, a particular computer environment. More specifically, the machine-dependence pertains to machine architectures, operating systems, compilers, and linkers, in which specific or unique features of the computer environment that cannot be easily used, if at all, in a different environment. Beyond the direct consequence of a lack of portability of the symbol table between platforms, a machine-dependent ad-hoc symbol table also has the consequence of the debugger being machine-dependent because the debugger must have the ability to parse and process the machine-dependent information in the symbol table, which in turn requires that the debugger be revised or at least be re-compiled for each specific computer type. While most debuggers are notoriously machine-dependent, recent research prototypes have achieved varying degrees of machine-independence with novel designs, such as by embedding symbol tables and debugging code in the target program. However, embedding symbol tables and debugging code in the target program results in relatively slow execution and a larger symbol table.

Two nearly machine-independent debuggers, ldb and cdb, are source-level debuggers for C. However, neither ldb nor cdb are completely machine independent. Ldb is described in N. Ramsey and D. R. Hanson, 'A retargetable debugger', *Proceedings of the SIGPLAN '92 Conference on Programming Language Design and Implementation, SIGPLAN Notices*, 27(7), 22–31 (1992). Ldb is easier to port to a different architecture, but it uses its own symbol-table format and thus requires cooperation from compilers. Cdb is described in D. R. Hanson and M. Raghavachari, 'A machine-independent debugger', *Software-Practice and Experience*, 26(11), 1277–1299 (1996). Cdb explores perhaps the extreme reaches of this design space: It is nearly completely independent of architectures and operating systems, but it achieves this independence by loading a small amount of code with the target program and by having the compiler emit a non-standard, but machine-independent, symbol table. Furthermore, cdb embeds symbol tables and debugging code in the target program. Cdb does illustrate how focusing on retargetability can simplify a debugger dramatically.

Furthermore, conventional symbol tables are designed as file formats and symbol tables are documented in torturously detailed specifications. Symbol table file formats are also difficult to change. For example, conventional debuggers can set breakpoints only on discrete lines of code, because the symbol-table format provides information only about lines even though the syntax of most languages is not line-oriented and includes operations that have embedded flow of control. Java's class files are described as a file format, and class files include metadata that map locations to line numbers as described in T. Lindholm and F. Yellin, *The Java Virtual Machine Specification*, Addison Wesley, Reading, Mass., 1997.

FIG. 1 shows a diagram of a debugger nub 110 in a conventional scheme. A nub 110 is the central feature of conventional designs. The nub 110 enables a debugger 130 to debug a target program 120 that is being debugged and that is running on the same computer or another computer as the nub 110. The nub 110 is a small program that controls the target program 120, and is responsible for actions such as setting breakpoints and stepping through code. The nub 110 provides a layer between the main debugger application 130 and the low level system operations. The nub 110 also provides debugging primitives. The nub 110 provides facilities for communicating with the debugger 130 and controlling the target 120. Low-level operations of the debugger 130 are performed by communicating with the nub 110 which is a small set of machine-dependent functions that are embedded in the target program 120 at compile-time.

As depicted in FIG. 1, all communication between the target program 120 and the debugger 130 goes through the nub 110. The nub 110 is a program loaded into memory with the target program 120. The debugger 130 can be either in the same memory address space as the target program 120, or in a separate memory address space. The latter configuration is a common one, because it protects the debugger 130 from corruption by the target program 120. Furthermore, the debugger 130 and the target program 120 can execute in the same computer in which the debugger 130 and the target program 120 communicate through a system bus. The debugger 130 and the target program 120 can also execute in different computers in which the debugger 130 and the target program 120 communicate through a relatively slow communication link, such as a Remote Procedure Call (RPC) channel.

Furthermore, in a conventional debugger 130, the management of user breakpoint information is performed by the debugger 130. In implementations where the debugger 130 and the target program 120 are implemented as separate processes, the debugger 130 process and the target program 120 process are burdened by communication overhead. More specifically, the target program 120 communicates to the debugger 130 which statement is being executed at any given point in time, and the target program 120 cannot proceed with execution until the debugger 130 determines that the target program 120 can proceed based on whether or not a breakpoint is set at that statement.

Interaction with the nub 110 is defined by an interface summarized below in Table 1. The interface is minimal because, while the interface itself is machine-independent, an implementation of the interface is not machine-independent. Furthermore, an implementation for a specific platform is dependent on all aspects of the platform. For example, the nub 110 used with debugger 130 depends only on a compiler, such as lcc, and an operating system, such as Unix variants or Windows NT/95/98 and is a relatively small component. The lcc compiler is described in C W. Fraser and D. R. Hanson, *A Retargetable C Compiler: Design and Implementation*, Addison Wesley, Menlo Park, Calif., 1995. The nub 110 has been implemented with other debuggers for other languages, as described in D. R. Hanson and J. L. Korn, 'A simple and extensible graphical debugger', *Proceedings of the Winter USENIX Technical Conference, Anaheim, Calif., Jan. 1997*, pp. 173–184.

TABLE 1

```
Typedef struct {
    char file[32];
    unsigned short x, y
Nub_coord_T;
typedef struct {
    char name[32];
    Nub_coord_T src;
    char *fp;
    void *context;
} Nub_state_T;
Typedef void (*Nub_callback_T) (Nub_state_T state);
Extern void _Nub_init(Nub_callback_T startup,
Nub_callback_T fault);
extern void _Nub_src(Nub_coord_T src,void apply(int I, const
Nub_coord_T *src, void *cl), void *cl);
extern Nub_callback_T _Nub_set(Nub_coord_T src,
Nub_callback_T onbreak);
extern Nub_callback_T _Nub_remove-
(Nub_coord_T src);
```

TABLE 1-continued

```
extern int _Nub_fetch(int apace, const void *address,
void *buf, int nbytes);
extern int _Nub_store(int space, void *address,
const void *buf, int nbytes);
extern int _Nub_frame(int n,
Nub_state_T *state);
```

The two data types Nub_coord_T and Nub_state_T and the seven functions _Nub_init(), _Nub_src(), _Nub_set(), _Nub_remove(), _Nub_fetch(), _Nub_store(), and _Nub_frame() defined in Table 1 permit a debugger 130 to control a target program 120 and permit a debugger 130 to read and write data from a target program 120. The nub 110 is mainly a conduit for opaque data. For example, the nub 110 has no information on specific symbol-table formats, but the nub 110 does provide simple mechanisms for reading specific symbol-table formats.

Function _Nub_init() is called by the start-up code and initializes the nub 110. The arguments of function _Nub_init() are pointers to callback functions that are called by the nub 110 to initialize the debugger 130 and to trap to the debugger 130 when a fault occurs. As disclosed below, the type Nub_state_T describes the state of a stopped target program 120, which occurs at start-up, breakpoints, and faults. Functions _Nub_set(), _Nub_remove(), and _Nub_src() collaborate to implement breakpoints. Stopping points define program locations at which breakpoints can be set in terms of 'source coordinates' specified by the type Nub_coord_T(). A coordinate consists of a file name, a line number (y) and a character number in that line (x). The set of allowable stopping points depends on the language and the compiler. Most embodiments of a conventional debugger 130 limits breakpoints to lines, while cdb and lcc permit breakpoints to be set at any expression. Function _Nub_src() enumerates the stopping points, calling an apply() function of the debugger 130 supplied for each point, function _Nub_set() sets a breakpoint, and function _Nub_remove() removes a breakpoint. When a breakpoint occurs, a breakpoint handler passed to function _Nub_set() as onbreak. is called with a Nub_state_T value that describes the current state of the target program 120. Onbreak" is a formal parameter name—the name of the actual argument, which is a pointer to a function that's called when a breakpoint occurs.

Function _Nub_fetch() and function _Nub_store() read and write bytes from the address space of target program 120 and return the number of bytes actually read and written. The target program 120 can have many abstract address spaces. For example, one abstract address space refers to the memory of target program 120, while other abstract address spaces refer to metadata about the target program 126, including its symbol table. The implementation of the compiler, the debugger 130, and the nub 110 define the conventions about address spaces. The nub 110 interface specifies only a way to access those spaces.

Finally, function _Nub_frame() traverses the call stack of the target program 120. The top stack frame is numbered 0 and increasing numbers identify frames higher up the call chain. Function _Nub_frame() moves to frame n and fills the Nub_state_T value with the state information describing that frame. The fields fp and context in the Nub_state_T value are opaque pointers that describe the state of the target program 120. For example, the pointers are typically passed to function _Nub_fetch() to fetch symbol-table entries and the values of variables.

The nub 110 interface does not require a machine-independent implementation. It is possible, for example, to provide an implementation that is specific to one architecture, operating system, and compilation environment.

Conventionally, the debugger 130 and nub 110 execute on the same computer, even when the target 120 is executing on a different computer, such as two different clients in a network. In this case, the nub 110 must communicate with the target 120 over significantly slower communication lines (not shown) than if all components were communicating across a common bus. This results in slow performance.

SUMMARY OF THE INVENTION

The above-mentioned shortcomings, disadvantages and problems are addressed by the present invention, which will be understood by reading and studying the following specification.

An abstract notation, such as a grammar, is used to specify a symbol table. Tools are used to generate computer-readable code for constructing, reading, and writing the symbol table from the abstract notation. More specifically, a first aspect of the present invention is directed to encoding a symbol table in an abstract notation, supported by an abstract notation interface component that generates code that constructs, reads and writes symbol tables in some concrete representation. In one embodiment, the contents of the external symbol table are defined by, or encoded in, a machine-independent grammar. The symbol table is stored separately from the executable target The abstract notation interface component is used as an interface between a nub and the symbol table. The nub provides an interface between the debugger and the executable target and the abstract notation interface component.

Using an abstract notation automates implementation of parts of the debugger. Furthermore, the abstract notation documents the symbol table concisely. Using a machine-independent grammar as an abstract notation also yields simplifications to the interface between the debugger and the target program. Furthermore, machine-independent grammar emphasizes that symbol tables are data structures, not file formats, and many of the pitfalls of working with low-level file formats are avoided by focusing instead on high-level data structures and automating the implementation details. Machine independent grammars provide debuggers and compilers that require less development time, use less storage space, and have faster performance and further provide symbol tables that use less storage space.

A second aspect of the invention is directed to dividing the management of breakpoints. Divided management of breakpoints is accomplished by using a split nub, a nub client associated with the executable target and a nub server associated with the debugger. Debugging performance is improved by storing the user breakpoint information in the nub client, so that the debugger does not need to be invoked in the determination of where to break execution. Divided management of breakpoints provides faster execution during debugging and is particularly valuable when communication between the executable target and the debugger is relatively slow, such as through a RPC channel.

Systems, clients, servers, methods, and computer-readable media of varying scope are described. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 11 is a block diagram of a data structure of stopping point flags of the external symbol table of FIG. 8 according to an exemplary embodiment of an abstraction of a symbol table and stopping points.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Abstract Syntax Description Language (ASDL) implementation of the invention is described. Finally, in the fifth section, a conclusion of the detailed description is provided.

Hardware and Operating Environment

Figure 2:
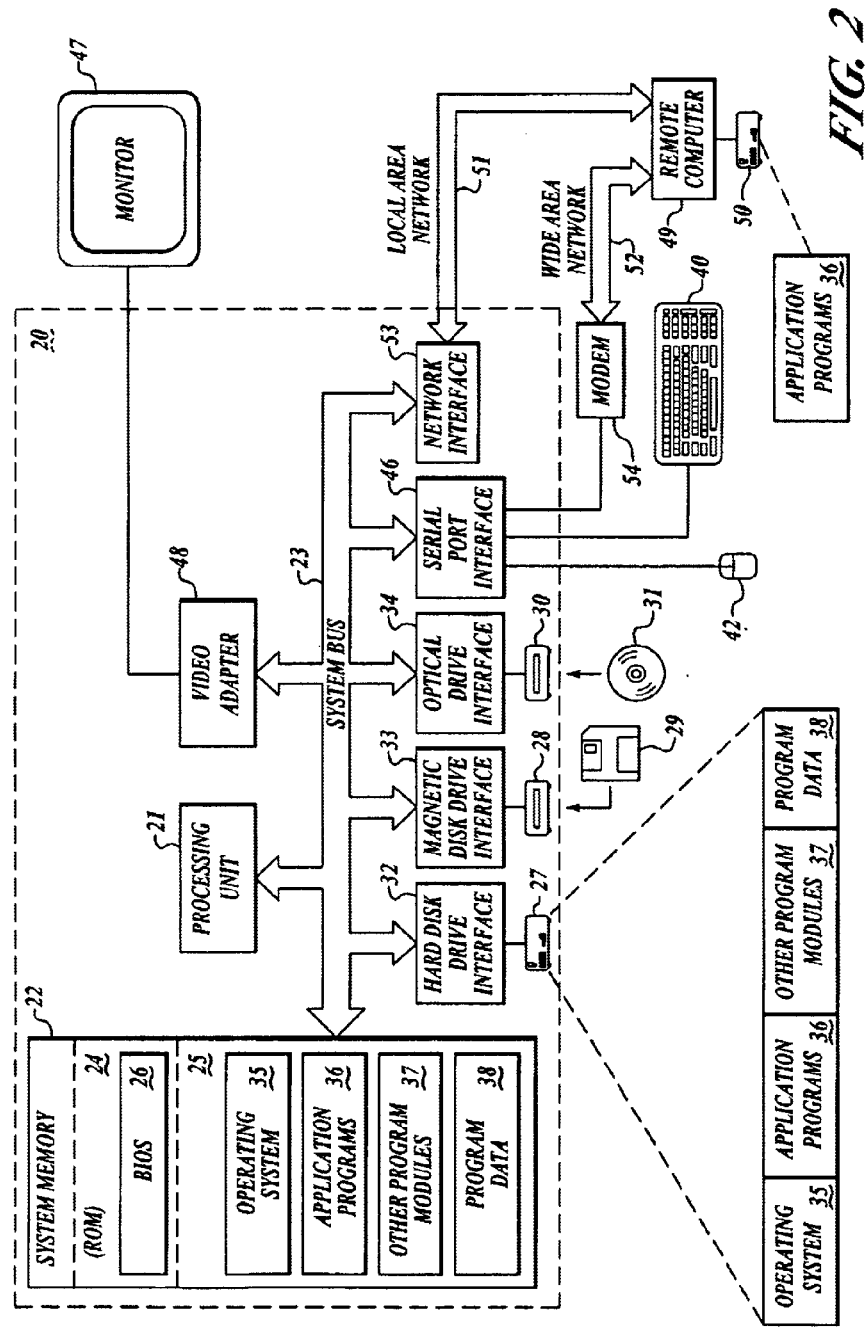
FIG. 2 shows a diagram of the hardware and operating environment in conjunction with which embodiments of the invention may be practiced.

FIG. 2 is a diagram of the hardware and operating environment in conjunction with which embodiments of the invention may be practiced. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer.

Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 2 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment. Further, carrier waves or other forms of electromagnetic signals are computer readable medium which may be used to transfer data.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 3.

The system 300 includes a debugger 310 executing on a server or other computer that serves as a master. The debugger 310 communicates with a server nub 320 that in turn communicates with a symbol table 330 and a client nub 340. The symbol table 310 in varying embodiments is located on the server or on the client. The nub server 340 communicates with the target executable program 350 through communication line 360. Communication line 360 in varying embodiments is a system bus 23 in computer 20 in FIG. 2, or a network communication line such as LAN 51 or WAN 52 in FIG. 2 implementing RPC. One of the primary purposes of debuggers is to control the execution of a program using breakpoints to stop execution of the program at desired points. In the present invention, the management of breakpoints in the execution of target executable program 350 is divided between the client nub 340 and the server nub 320. Management includes determining whether or not a particular line of executable code has a breakpoint set on it, and therefore, whether or not to suspend execution of the target 350 in wait of a command from the debugger 310 or to proceed with execution of the line of executable code. Delegating a portion of the management of breakpoints to the client nub 340 is more efficient than managing breakpoints from the server nub 320 because it reduces the breakpoint-associated communication traffic on line 360, which speeds up the management of breakpoints and also reduces traffic on communication line 360, thus freeing up bandwidth for other processes and resulting on over-all improvement of performance of computer 20. The performance improvements appreciate in reverse-correspondence to the speed of communication line 360. More specifically, the slower the communication line 360, the greater the performance improvement in the management of breakpoints.

In another aspect of the invention, the symbol table 330 is defined by an abstract notation, such as a grammar. More specifically, a grammar is written in a metalanguage, such as Abstract Syntax Description Language (ASDL). Furthermore, abstract notation tools generate code for constructing, reading, and writing the symbol table from the abstract notation.

The system level overview of the operation of an exemplary embodiment of the invention has been described in this section of the detailed description. While the invention is not limited to any particular debugger, symbol table, nub, server, client, communication line and grammar, for sake of clarity a simplified debugger, symbol table, nub, server, client, communication line and grammar has been described.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 4:
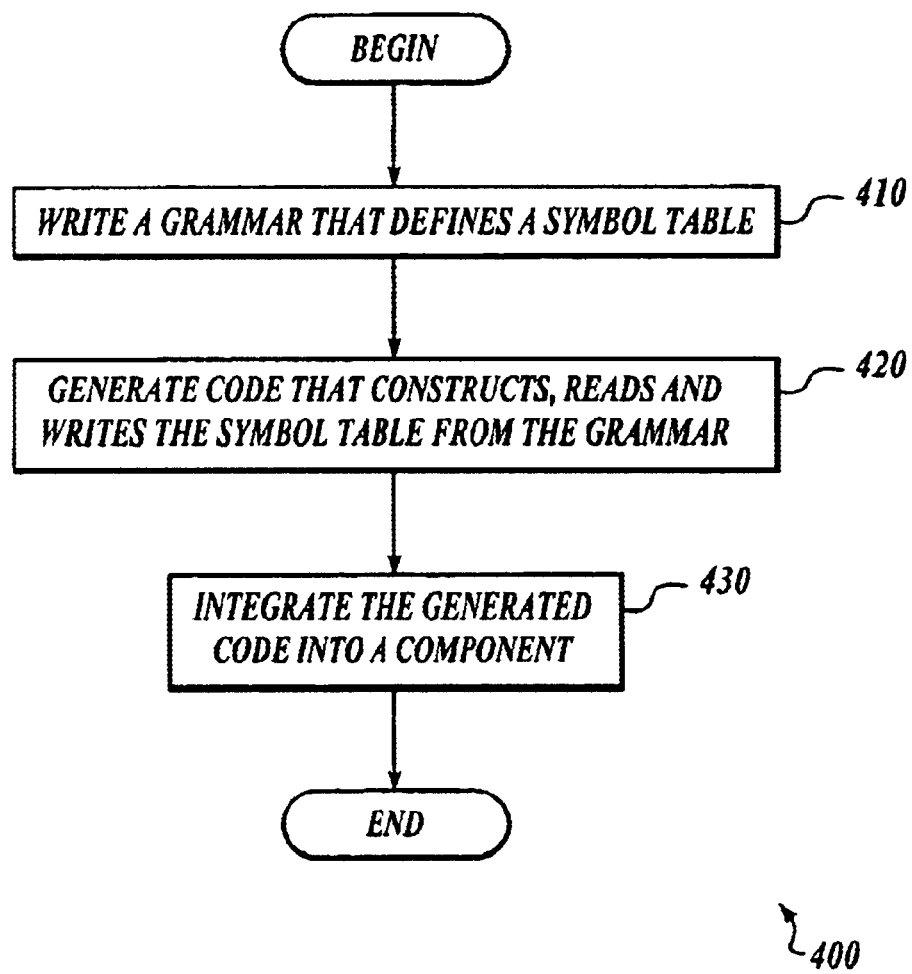
FIG. 4 is a flowchart of a method to be performed by a client according to an exemplary embodiment of the invention.

Referring next to FIG. 4, a flowchart of a method to be performed by a client according to an exemplary embodiment of the invention is shown. This method is inclusive of the acts required to be taken by a computer, such as computer 20 in FIG. 2.

Method 400 illustrates a computerized method for managing a symbol table that begins with writing a grammar that defines a symbol table 410. Subsequently, the method includes generating source code that constructs, reads and writes a symbol table in a machine-independent grammar 420. The source code is a kind of cryptic computer program containing a number of computer-readable instructions. In one embodiment the grammar is written in the Abstract Syntax Description Language (ASDL). In another embodiment, the symbol table is associated with, and used by, a debugger.

Notwithstanding the abstract encoding of the symbol table, the data, such as addresses, symbol names, types, source-coordinate (stopping point), and addresses as abstract value are encoded in a machine-dependent notation because addresses in symbol tables are typically machine-dependent. Injected code is a portion of the symbol table that enables the debugger to derive absolute addresses from array indices identified in the symbol table. The encoding of the symbol table in a grammar reduces the size, amount and storage space of the injected code because a significant portion of information in the symbol table that is not injected code is represented by the grammar. Rather than emitting symbol tables as initialized data structures embedded in the target program, the present invention uses grammar tool-generated code to build the symbol table and write it to an external file.

The method 400 further includes integrating the generated source code into a component 430, such as a development tool. Examples of development tools are debuggers and compilers. More specifically, integrating the source code 4320 includes compiling the generated source code and linking the code with the component. The code is integrated into the component so that the component is able to construct, read, and write the symbol table in the grammar. Thereafter, the method 400 ends.

The particular methods performed by a computer of an exemplary embodiment of the invention have been described. The method performed by a computer has been shown by reference to a flowchart including all the acts from generating code to be used by a debugger until integrating the code into the debugger.

Figure 5:
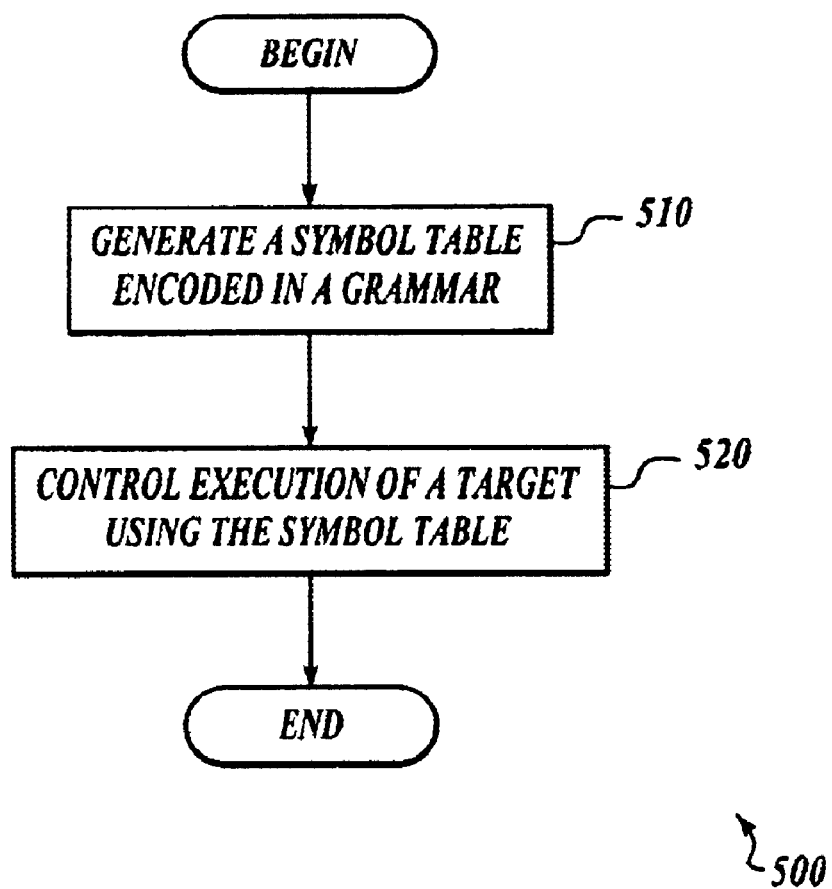
FIG. 5 is a flowchart of a method to be performed by a client according to an exemplary embodiment of the invention.

Referring next to FIG. 5, a flowchart of a method to be performed by a client according to an exemplary embodiment of the invention is shown. This method is inclusive of the acts required to be taken by a computer, such as computer 20 in FIG. 2.

Method 500 is a computerized method for debugging a target program in which the target program is associated with a symbol table. Method 500 begins with generating the symbol table, the symbol table being specified by the grammar 510. The symbol table is generated, or emitted, by a compiler More specifically, the compiler constructs the grammar-specified data structures, initializes them, and writes them to the symbol table. In alternative embodiments, the symbol table is stored in a separate file from the target program, as shown in FIG. 3, or the symbol table is stored in the same file with the target program. In one embodiment, the grammar is a machine-independent grammar such as ASDL. The method also includes controlling execution of the target program in reference to the symbol table 520. More specifically, execution of the target program is controlled using information, such as breakpoint information, in the symbol table. Controlling execution includes reading or receiving a debugging instruction or command, such as "set breakpoint at line 30," accessing the symbol table to obtain the parameters for the command, such as the address of line 30, sending the command, and receiving a response. In one embodiment, the controlling also includes reading symbol table information from the symbol table using a grammar interface component (GIC), the GIC being created from code generated by a grammar tool.

The particular methods performed by a computer of an exemplary embodiment of the invention have been described. The method 500 performed by a computer has been shown by reference to a flowchart including all the acts from generating code to be used by a debugger until integrating the code into the debugger.

Figure 6:
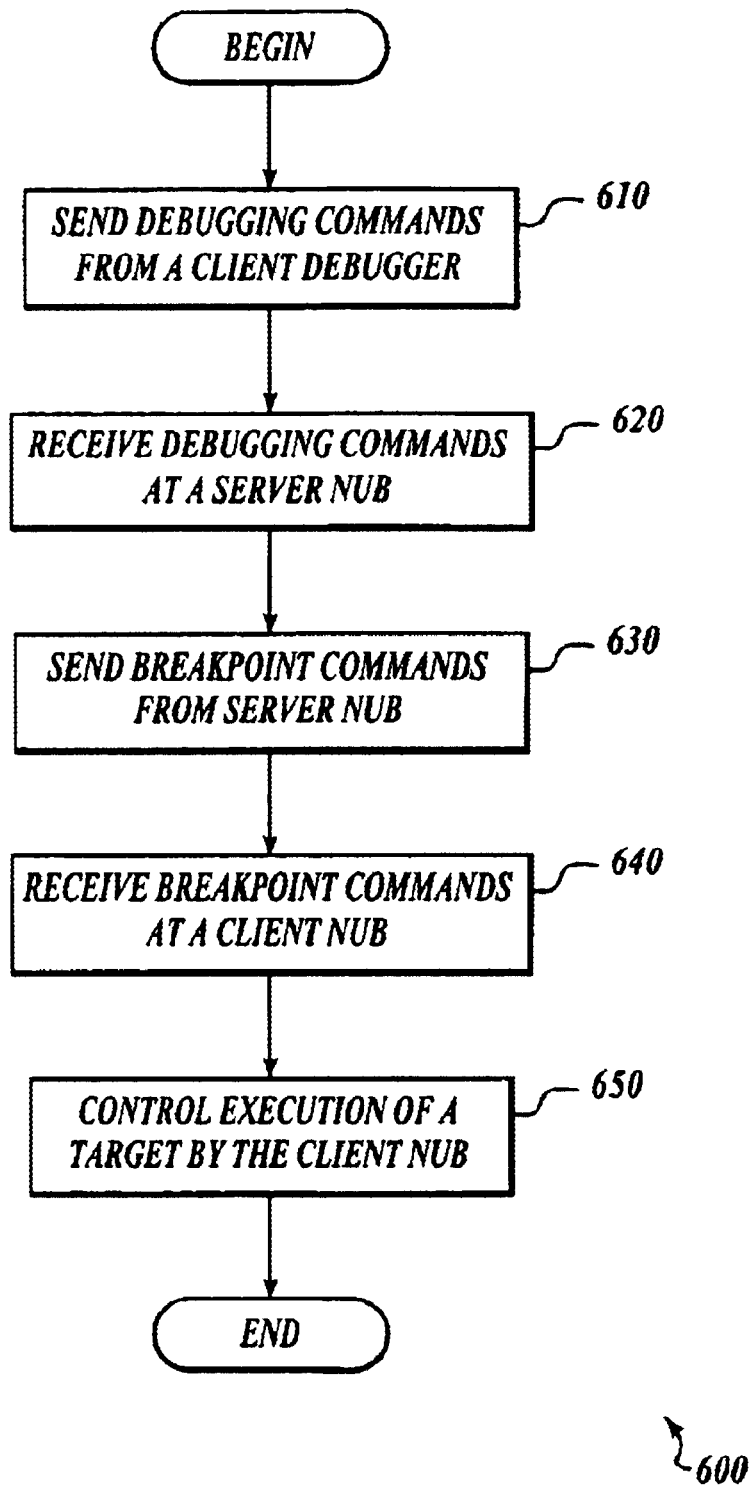
FIG. 6 is a flowchart of a method to be performed by a client according to an exemplary embodiment of the invention.

Referring next to FIG. 6, a flowchart of a method to be performed by a client according to an exemplary embodiment of the invention is shown. This method is inclusive of the acts required to be taken by a computer, such as computer 20 in FIG. 2.

Figure 3:
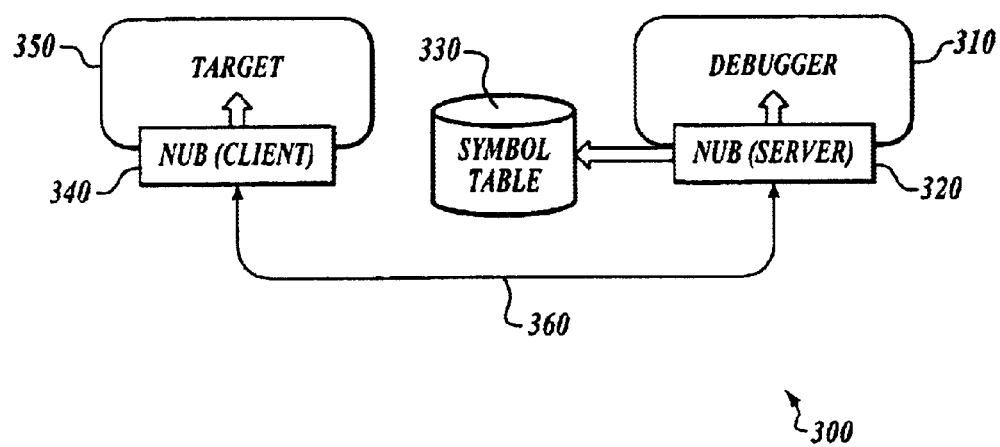
FIG. 3 is a diagram illustrating a system-level overview of an exemplary embodiment of the invention.

Method 600 is a computerized method for debugging a target program that begin with sending one or more debugging commands 610 from a debugger executing on a server, such as debugger 310 in FIG. 3, directed to a target executable program on a client, such as target 350 in FIG. 3. Thereafter, method 600 includes receiving the debugging commands 620 by a server nub, such a server nub 320 in FIG. 3, executing on the server. Subsequently, method 600 includes sending breakpoint commands 630 from the server nub over a communication line such as communication line 360 in FIG. 3, and receiving the breakpoint commands 640 from the communication line at a client nub, such as client nub 340 in FIG. 3, executing on the client. The execution of the target executable program is controlled by the client nub 650 using the breakpoint commands.

Controlling the execution of the target executable program by the client nub 650 includes executing an executable statement in the target executable program, determining whether a breakpoint command set a breakpoint on the executable statement, and sending an indication of a breakpoint if the client nub determines that a breakpoint is set on the executable statement, to the debugger.

The particular methods performed by a computer of an exemplary embodiment of the invention have been described. The method performed by a computer has been shown by reference to a flowchart including all the acts from 610 until 650*w*.

ASDL Implementation

In this section of the detailed description, a particular implementation of the invention is described in which the grammar is written in the Abstract Syntax Description Language (ASDL). This section includes five sections: apparatus, ASDL, an exemplary abstraction of a symbol table and stopping points, symbol tables, breakpoints, and stack frames.

Apparatus

Figure 7:
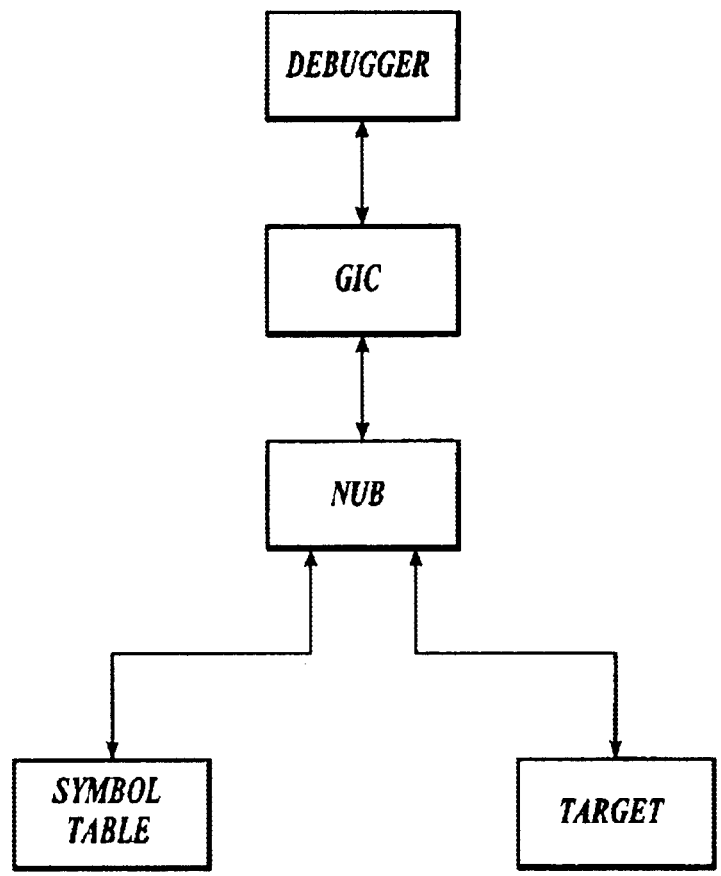
FIG. 7 is a block diagram of an apparatus for managing a symbol table defined by a grammar according to an exemplary embodiment of the invention.

Referring next to FIG. 7, a block diagram of an apparatus 700 for managing a symbol table defined by a grammar according to an exemplary embodiment of the invention.

Figure 1:
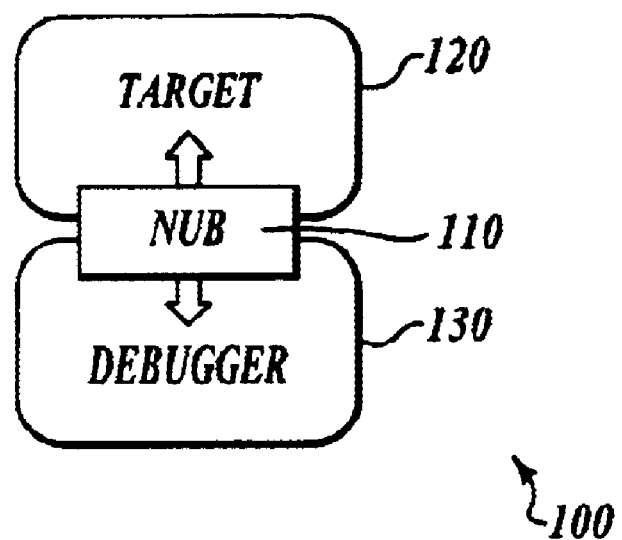
FIG. 1 shows a diagram of a nub in a conventional debugger 130 scheme.

System 700 is distinguished from the prior art, such as disclosed in conjunction with FIG. 1, in that the system includes a grammar interface component (GIC) 710. The GIC acts as an interface between the debugger 720 and the nub 730. The GIC 710 has knowledge of, or information describing, a grammar, with which the debugger communicates. As a result, the debugger 720 is not required to contain or access machine-dependent information, and therefore the debugger 720 is less complex in its design because the debugger 720 is more abstract in its information processing. Furthermore, the debugger 720 is machine-independent in architecture and design and is therefore and operable and useful on numerous platforms. The GIC 710 is operatively coupled to the debugger 720 and the nub 730. The nub 730 is operatively coupled to the symbol table 740. The symbol table is defined by a machine-independent grammar. A target program 750 is separate from the symbol table 740 and is operatively coupled to the nub 730.

ASDL

In an ASDL embodiment, the symbol table, such as symbol table 740 in FIG. 7, is defined by a 31-line grammar in the Abstract Syntax Description Language (ASDL). ASDL is a domain-specific language for specifying tree data structures. ASDL is a language developed as part of the Zephyr National Compiler Infrastructure project. ASDL combines an object-oriented type system, syntax-directed translation schemes and a target-language interface as described at http://www.cs.princeton.edu/zephyr/ASDL/ and in "The Zephyr Abstract Syntax Description Language", D. C. Wang, et al, USENIX Conference on Domain-Specific Languages, Santa Barbara, Oct., 1997. pp. 213–227. In one embodiment, GIC 710 in FIG. 7 is generated from code produced by the ASDL tool asdlGen, as described in detail below in this subsection. ASDL components accept an ASDL grammar and generate code to construct, read, and write the data structures defined in the grammar. Using ASDL automates implementing parts of the debugger, such as debugger 720 in FIG. 7. Using a grammar documents the symbol table, such as symbol table 740 in FIG. 7, concisely. Using machine-independent grammar also yields simplifications to the interface between the debugger, such as debugger 720 in FIG. 7, and the target program, such as target program 750 in FIG. 7. Furthermore, machine-independent grammar emphasizes that symbol tables are data structures, not file formats in which many of the pitfalls of working with low-level file formats are avoided by focusing instead on high-level data structures and automating the implementation details.

The entire ASDL grammar is listed below in Table 2, which illustrates ASDL grammar suitable for a symbol table. The line numbers in the left-hand column of the table are for explanatory purposes only. ASDL is a domain-specific language for specifying tree data structures, and it's simple enough that it can be described easily by examples. An ASDL grammar is significantly similar to the definition of an algebraic data type. An ASDL grammar consists of a sequence of ASDL productions that define an ASDL type by listing its constructor, the fields associated with each constructor, and the fields associated with all constructors for that type, which are called attributes. For example, lines 19–31 in table 2 define 12 constructors for the ASDL type named 'type', and the integer attributes size and align, which are common to all 12 constructors. The ASDL type "int" is a built-in type for integers. The ASDL type 'type' represents C data types. The first four constructors (lines 19–22 in the following table 2) define simple constructors for the basic C types; these constructors have no constructor-specific fields, only the common attributes. A compiler of the present invention emits instances of these constructors for all of the C basic types. For example, on a 32-bit machine, the C type 'int' is represented with an instance of INT with a size and align both equal to 4, and an INT with a size and align equal to 1 represents the C type 'char'. The other basic C types are similarly represented as follows in table 2:

TABLE 2

```
1    module sym {
2    module      = (identifier file, int uname, int nuids,
3                     item* items, int globals, spoint* spoints)
4    spoint      = (coordinate src, int tail)
5    item        = Symbol (symbol symbol)
6                | Type(type type)
7                attributes(int uid)
8    coordinate  = (identifier file, int x, int y)
9    symbol      = STATIC(int index)
10               | GLOBAL(int index)
11               | TYPEDEF
12               | LOCAL(int offset)
13               | PARAM(int offset)
14               | ENUMCONST(int value)
15               attributes(identifier id, int uid, int module,
16                  coordinate src, int type, int uplink)
17   field       = (identifier id, int type, int offset, int bitsize, int lsb)
18   enum        = (identifier id, int value)
19   type        = INT
20               | UNSIGNED
21               | FLOAT
22               | VOID
23               | POINTER(int type)
24               | ENUM(identifier tag, enun* ids)
25               | STRUCT(identifier tag, field* fields)
26               | UNION(identifier tag, field* fields)
27               | ARRAY(int type, int nelems)
28               | FUNCTION(int type, int* formals)
29               | CONST(int type)
30               | VOLATILE(int type)
31               attributes(int size, int align)
32   }
```

Line 23 in table 2 defines the constructor for C pointer types; it has one integer field (type) that identifies the referent type. ASDL grammars define trees, not graphs, so instances of ASDL types that are used more than once must be referenced indirectly. As described below, this ASDL grammar associates integers with instances of ASDL types that represent C types and C symbols. The constructors for arrays (line 27 in table 2), functions (line 28 in table 2), and qualified types (lines 29 and 30 in table 2) also have integer fields that identify their referent types.

Line 24 in table 2 defines ENUM, a constructor for C enumeration types. The first field (tag) of ENUM is an identifier, which is a built-in ASDL type, for the enumeration's C type tag. The second field (ids) in the definition of ENUM is a sequence of enum types; the asterisk denotes a sequence. Line 18 in table 2 defines ENUM as a record type with fields for the enumeration identifier and its associated value.

Structures and unions are defined similarly in lines 25 and 26 in table 2. Both constructors in line 25 and line 26 of table 2 carry the structure or union tag and a sequence of field records, which give the name, type, location of each C structure or union field. Bit fields are identified by nonzero values for bitsize and lsb. Function types (as in line 28 in table 2) include a type for the return value (type) and a sequence of integers that identify the formal parameter types.

AsdlGen generates all of the code necessary for constructing instances of the types defined in the grammar. To build an ASDL tree for a C type, a compiler of the present invention simply traverses its internal representation for the type and calls the appropriate generated functions. For example, given the C type declaration:

enum color {RED=1,GREEN,BLUE};

The present invention executes the equivalent of the following statement, assuming that enumeration types are implemented with 4-byte integers:

type=sym_ENUM(4, 4, color,
  Seq_seq(sym_enum(RED, 1),
    sym_enum(GREEN, 2), sym_enum(BLUE, 3),
      NULL));

The code in a compiler of the present invention is nearly as simple as this example suggests. A single 75-line procedure handles all 12 constructors.

AsdlGen generates code in C, C++, Java, ML, or Haskell, so clients can be written in whatever language best suits the application.

An Exemplary Abstraction of a Symbol Table and Stopping Points

The program below in table 3 contains a program that is used to illustrate a related external symbol table, a symbol-table tree data structure, address table data structures emitted into generated code, and a stopping point flags data structure, in following figures. The program prints the sum of the first N integers where N is given as a program argument.

TABLE 3

```
int sum =0;
int sumof (int n) {0
  static int lastn = 0;
  if (1n != lastn) {2
    int i;
    3sum = 0
    for (4i = 1; 5i <= n; 6i++)
      7sum += i;
    8lastn = n;
  9}
  return 10sum;
}
void main(int argc, char *argv[ ]) {11
  int n = 12atoi(argv[1]);
  int k;
  for (13k = 0; 14k <= n; 15k++);
    16printf("sum(%d) = %d∫n", k, sumof(k));
17}
```

The italicized superscript numbers in the program source code of table 3 indicate the stopping points.

Figure 8:
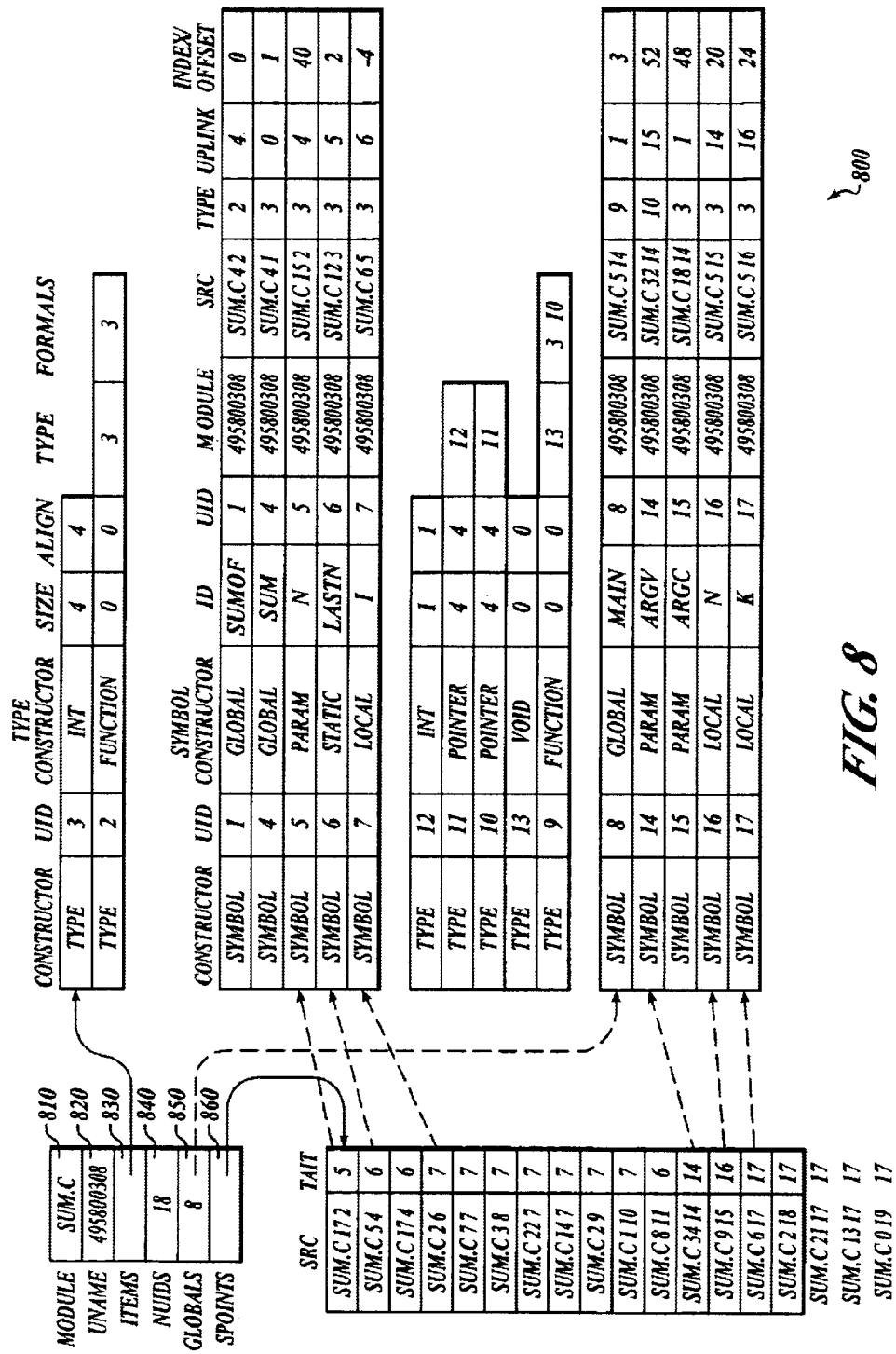
FIG. 8 is a block diagram of an example of an external symbol table data structure according to an exemplary embodiment of an abstraction of a symbol table and stopping points.

FIG. 8 is a block diagram of an example of an external symbol table data structure 800 according to an exemplary embodiment of an abstraction of a symbol table and stopping points of the program in table 3. FIG. 8 shows an external compiler symbol table 800 generated during the compilation of the program in table 3. Entry "module" 810 represents the file name "sum.c". Entry "uname" 820 represents the 'unique name', integer 495800308. The "item" field 830 items represents all types and symbols that appear in the program in table 3. The entry "nuids" 840 indicates there are 18 unique identifiers—uids for short—in the program in table 3. The entry "globals" 850 represents the uid, for example 8, for main, for the last global symbol from which all other globals can be reached. Lastly, entry "spoints" 860 represents a list of 18 stopping points. The italicized superscripts in the program above identify the locations of the stopping points.

Figure 9:
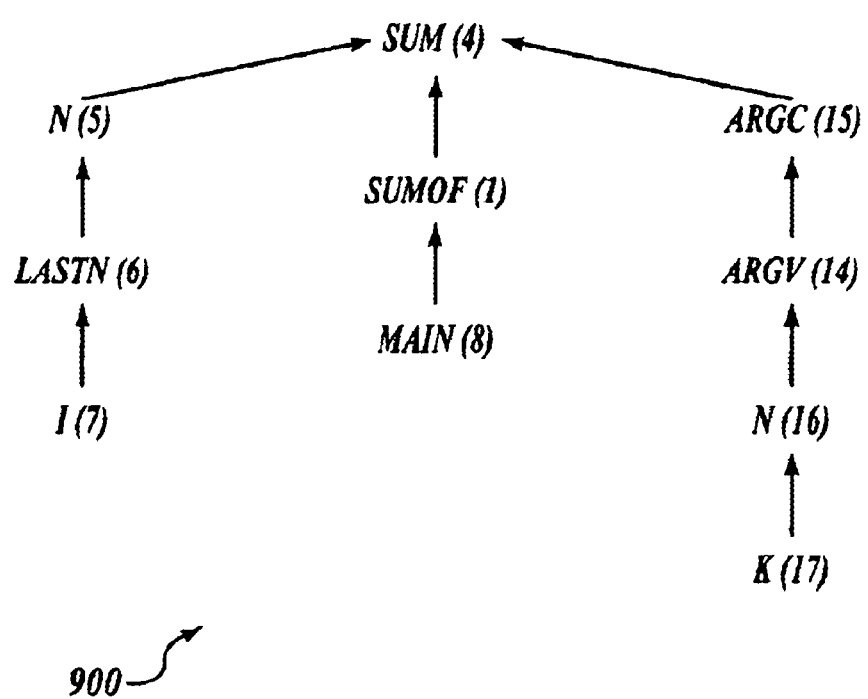
FIG. 9 is a diagram of a symbol-table tree data structure of the external symbol table of FIG. 8 according to an exemplary embodiment of an abstraction of a symbol table and stopping points.

FIG. 9 is a diagram of a symbol-table tree data structure 900 of the external symbol table of FIG. 8 according to an exemplary embodiment of an abstraction of a symbol table and stopping points of the program in table 3. The symbol-table tree 900 indicates related uplink fields in the individual symbols. The parenthesized numbers in the tree 900 are the symbol's uids associated with entry 840 in FIG. 8.

Figure 10:
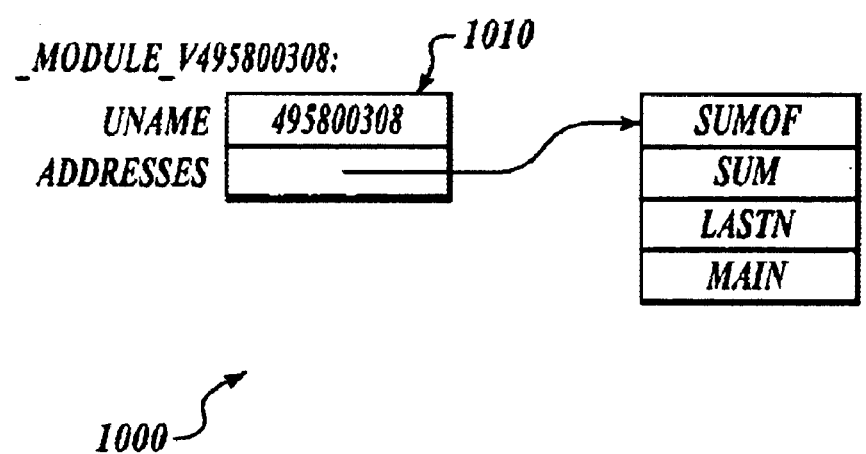
FIG. 10 is a block diagram of an example of the address table data structures emitted into the generated code of the external symbol table of FIG. 8 according to an exemplary embodiment of an abstraction of a symbol table and stopping points.

FIG. 10 is a block diagram of an example of the address table data structures 1000 emitted into the generated code of the external symbol table of FIG. 8 according to an exemplary embodiment of an abstraction of a symbol table and stopping points. The array __module__V495800308 at 1010 is the list of addresses of the global symbols. The name of the array 1010 is derived from the module's unique name.

FIG. 11 is a block diagram of a data structure of stopping point flags of the external symbol table of FIG. 8 according to an exemplary embodiment of an abstraction of a symbol table and stopping points. __Nub__bpflags is an array 1100 of eighteen stopping point flags 1110, 1120, 1130, 1140, one for each stopping point. The stopping point flags 1110, 1120, 1130, 1140 initialized to 0.

Symbol Tables

A compiler of the present invention builds instances of the ASDL type symbol, lines 9–16 in table 2, for each visible identifier. The constructors correspond to the different kinds of identifiers that appear in C programs. All symbols include the attributes defined in lines 15 and 16 in table 2. The id field holds the symbol name itself, the uid field gives the symbol's unique identifying integer, uid for short, type holds the uid for the symbol's type, and src gives the location in the source program where the symbol is defined. As shown in line 8 of table 2, a coordinate is a record that holds a file name (file), a line number (y), and a character number in that line (x).

The uplink field holds the uid for the previous symbol in the current scope or the last symbol in the enclosing scope. These fields form an inverted tree. Given a symbol in the tree, that identifier and its ancestors comprise the set of visible identifiers in the compilation unit.

Table 4 shows the declaration fragments of a target program, wf.c in the upper portion of the table, and the corresponding tree of symbols in the lower portion of the table. More specifically, table 4 is related to lines 9–16 of the symbol table in table 2. The arrows represent the uplink fields. For instance, if the target stops somewhere in the body of getword, the debugger determines that the symbol for c identifies the set of visible symbols, which is given by following the arrows:

TABLE 4

```
c s buf words main tprint getword isletter
static int isletter(int c) { ... }
static int getword(char *buf) { char *s; int c; ... }
void tprint(struct node *tree) { ... }
static struct node *words = NULL;
int main(int argc, char *argv[]) {char buf[40]; ... }
```

```
             isletter  ←———  getword
                                  ↑
                                  |
    words  ———→  main  ———→  tprint
    ╱ ╱ ╲ ╲
   c  buf  tree  argc  ←———  argv
   ↑                          ↑
   |                          |
   s  ←———  c                buf
```

The module attribute is a unique integer name for the compilation unit in which the identifier appears. Global and static variables (GLOBAL and STATIC, lines 9 and 10 in table 2) include the indices in the array of addresses described below, locals and parameters (LOCAL and PARAM, lines 12 and 13 in table 2) include their offsets from the shadow stack frame, and enumeration constants (ENUMCONST, line 14 in table 2) include the associate values.

A compiler of the present invention wraps all of the symbol-table data into an instance of the ASDL type module defined in lines 2 and 3 in table 2. This record starts with fields that give the file name of the compilation unit, such as "file" and a unique integer name for the unit, such as "uname" generated by a compiler of the present invention. The integer name of the unit is also used to generate the name of the external symbol-table file to which the compiler of the present invention writes the module using the procedure generated by asdlGen from the ASDL grammar.

A module also includes a sequence of item instances which associate a symbol or type with a uid, such as lines 5–7 in table 2, and the uid of the last global or static variable (the global field). For example, the global field in the module for the code in the upper portion of table 4 would contain the uid for words. The global fields are used for traversing all globals and statics in all compilation units during symbol-table searches.

The external symbol table contains everything about program identifiers except the addresses of globals (including functions), which are unknown until link time. A compiler of the present invention emits into the target program an instance of the C type:

```
struct module {
    unsigned int uname;
    void **addresses;
};
``` where uname is initialized to the integer name for the compilation unit and addresses is initialized to an array of addresses of the global identifiers defined in the unit. For example, a compiler of the present invention emits into read-only memory the equivalent of the following C fragments for the program code in the lower portion of table 4:

```
const struct module __module__V49499895 = {
    0x49499895;
    &L93;
};
const void *L93[ ] = { &words, main, tprint, getword, isletter };
```

The variable __module__V494999f8 includes the module's unique integer name. At link-time, a script scans all object files for names of this form and generates an initialized array of pointers to the module structures. For example, if wf.c in the lower portion of table 4 is compiled with lookup.c and the resulting object files are linked together, the linking script generates the following code:

```
extern struct module __module__V49499895, __module__V494999f8;
const struct module *__Nub__modules[ ] = {
    &__module__V49499895;
    &__module__V494999f8;
    0
};
char __Nub__bpflags[37];
```

The object file for the immediately preceding source code is compiled and loaded with the target program along with the nub. __Nub__modules gives the nub access to all of the module structures and thus to the files holding the symbol tables for all of the separately compiled C source files. The debugger uses __Nub__fetch to read the module structures and the address arrays. __Nub__bpflags is described in the next section.

Breakpoints

The last field in a module, "spoints", line 3 in table 2, is a sequence of spoint records, line 4 in table 2, which maps stopping points. The stopping point spoints, are the sequence element indices to source coordinates and indicate the uid for the symbol-table 'tail' for each stopping point. Stopping points are used to implement __Nub__set, __Nub__remove, and __Nub__src and to supply the uid for the appropriate symbol when a breakpoint occurs. A debugger of the present invention can set breakpoints at any individual expression and on the entry and exit points of compound statements. For example, the italicized superscripts in the following example written in C language identify the stopping points in getword:

```
Static int getword(char *buf) {[8]
    char *S;
    int c;
    while ([9](c = getchar( )) != −1 &&[10] isletter(c) == 0)
        [11];
    for ([12]s = buf; [13](c = isletter(c)) != 0; [14]c = getchar( ))
        [15]*s++ = c;
    [16]*s = 0;
    if ([17]s > buf)
        return [18]1;
    return [19]0;
}
```

The immediately preceding portion of C language program source code shows the stopping points in line 3 of the symbol table in table 2. The superscript numbers in the immediately preceding portion of C language program source code indicate the number of the stopping point. Note that it's possible to set a breakpoint on the right operand of the short-circuit AND operator, && as in breakpoint 10. The compiler emits code at each stopping point that is essentially equivalent to the C expression:

(__Nub__bpflags[n]!=0&&__Nub__bp (n), expr)

where expr is the C expression at the stopping point n. For example, a compiler of the present invention emits:
if((__Nub__bpflags[17]!=0&&__Nub__bp(17), s>buf))

For the "if" statement containing stopping point 17 __Nub__set plants a breakpoint at a given source coordinate by searching the spoints sequence for the coordinate. If the coordinate is found, __Nub__set writes a one to the corresponding index in __Nub__bpflags. __Nub__remove clears an element in __Nub__bpflags. __Nub__set and __Nub__remove are implemented in the server (debugger) side of the nub, and they use __Nub__store with a distinguished address space identifier to write __Nub__bpflags, which is in the client side, the target side of the nub.

When a breakpoint occurs, __Nub__bp uses the stopping point number to initialize the fields of the Nub__state__T value it passes to the debugger's call back function. The stopping point number leads to the source coordinate for the stopping point, the name of the function in which that point appears, and the uid of symbol that represents the set of visible identifiers at that point. The uid is used to set the context field in the Nub__state__T value to the appropriate symbol. The fp field is set to the appropriate shadow stack frame, as described below.

A given stopping point, for example breakpoint 17, can appear in every separately compiled module. Thus, __Nub__ bp can be called at a non-existent breakpoint. The client-side nub passes this event on to the server-side nub, which dismisses extraneous breakpoints. This scheme simplifies the client-side nub at the cost of recognizing these occasional extraneous events. It also permits the module with the most stopping points to determine the size of __Nub__ bpflags, which is generated at link-time. In comparison, in conventional debuggers, each separately compiled module is included an array whose length is the number of stopping points in that module.

Stack Frames

The nub must understand stack frames just enough to implement __Nub__frame and to provide an appropriate context for addressing parameters and locals. It does not, however, have to provide access to the machine-dependent details of the stack, because the interface provides no way to access or to use them. As in the original implementation, the revised implementation uses a shadow stack embedded in the normal call stack, but the revised frames are simpler and smaller. At function entry, the compiler generates a local variable by simulating the following declaration where tos is a generated name.

```
struct sframe {
    struct sframe *up, *down;
    int func;
    int module;
    int ip;
} tos;
```

There is no separate allocation required for tos. Tos is allocated along with other locals during function entry. A compiler of the present invention also emits code to initialize the fields. For example, for getword, the compiler emits:
tos.down =__Nub__tos;
tos.func =2;
tos.module =0x49499895;
__Nub__tos=&tos;

The nub's private global __Nub__tos always points to the top frame on the shadow stack. The down field points to the previous shadow stack frame, the func field is the uid of the function, and the module field is the unique integer name for the compilation unit. The ip field is set the stopping point number when a breakpoint occurs and just before calls. The up field points up the shadow stack and is used only by __Nub__frame, which initializes this field only when necessary. A compiler of the present invention also emits code at calls to set the ip field and at returns to pop the shadow stack by assigning tos.down to __Nub__tos.

Given a shadow stack frame, __Nub__bp builds a Nub__ state__T value, as described above. The offsets stored in PARAM and LOCAL symbol values, lines 12 and 13 in table 2, are offsets from the shadow stack frame. All of these computations are done at the intermediate-code level, and are they independent of the target machine. The computations do, however, depend on some of the details of the compiler of the present invention's code generator architecture. For example, the offsets are computed by accessing code-generator data structures.

A compiler of the present invention emits symbol tables as initialized C data structures, so their form is machine independent. The debugger reads these symbol tables by calling function __Nub__fetch() with an address space value that identifies the symbol table. Symbol-table entries include type and address information, so, given a symbol-table entry for a variable, debugger can fetch and display the values of the variable. Symbols are organized in an inverted tree according to scope. Provided a symbol, the symbol and symbol ancestors are visible.

To implement __Nub__frame(), a compiler of the present invention emits code to build a 'shadow stack' embedded in the normal call stack. This is accomplished by defining a local variable with a structure type for the shadow stack frame layout, and emitting code to link and unlink this frame at procedure entry and exit. There's no separate memory allocation involved, because the shadow stack frame is allocated along with other locals at procedure entry. The nub uses these frames to build Nub__state__T values, which are passed to the breakpoint and fault callback functions. Again, a compiler of the present invention emits these data and its associated code in its machine-independent intermediate representation.

Modifying a debugger to use an external symbol table requires a precise definition of the external representation, and functions to construct, read, and write the data. ASDL automates a significant portion of the functions and asdlGen, one of the ASDL tools, generates a significant portion of the necessary code.

The system components of debuggers, symbol tables, nubs and executable targets can be embodied as computer hardware circuitry or as a computer-readable program, or a combination of both. More specifically, in the computer-readable program embodiment, the programs can be structured in an object-orientation using an object-oriented language as described above, such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or inter-process communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

An implementation of a compiler and a debugger that uses ASDL of the present invention has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all of these environments. Therefore, it is manifestly intended that this invention be limited only by the following claims and equivalents thereof.

I claim:

1. A computerized method for debugging a target program having a plurality of modules, the computerized method comprising:
    communicating, by a server nub to a client nub of a debugger, stopping points common to the modules;
    communicating, by the client nub to the server nub, an event notification when the client nub encounters a stopping point within a module, the event notification contains information associated with the stopping point;
    determining, by the server nub, whether the stopping point corresponds to an extraneous breakpoint; and
    if the stopping point corresponds to an extraneous breakpoint, dismissing the breakpoint.

2. The computerized method for debugging a target program as in claim 1, the controlling execution of the target executable program by the client nub further comprising:
    executing an executable statement in the target program;
    determining whether a breakpoint command set a breakpoint on the executable statement; and
    sending an indication of a breakpoint if the determining indicates that a breakpoint is set on the executable statement, to the debugger.

3. The computerized method for debugging a target program as in claim 1, the method further comprising:
    sending a plurality of debugging commands from a computer program debugger executing on a server directed to the target executable program on a client;
    receiving the debugging commands by a server nub executing on the server;
    sending the breakpoint commands from the server nub; and
    receiving the breakpoint commands through a communication line at the client nub executing on the client.

4. A computer-readable medium having computer-executable instructions to cause a server program to perform a method comprising:
    setting stopping points in modules of a program, the stopping points are common to the modules;
    receiving from a client nub an event notification containing information about a stopping point encountered by the client nub;
    in response to receiving the event notification, determining whether the stopping point corresponds to an extraneous breakpoint; and
    if the stopping point is determined to correspond to an extraneous breakpoint, dismissing the breakpoint.

5. A computer system for debugging a computer program having a plurality of modules, comprising:
    means for a server to set stopping points common to the modules;
    means for the client to communicate information about a stopping point in a module to the server;
    means for the server to determine whether the stopping point corresponds to an extraneous breakpoint; and
    means for dismissing the extraneous breakpoint.

6. A computer-implemented method for debugging a program having a plurality of modules, the computer-implemented method comprising:
    communicating, by a server nub to a client nub of a debugger, stopping points common to the modules;
    communicating, by the client nub to the server nub, an event notification when the client nub encounters a stopping point within a module, the event notification contains information associated with the stopping point;
    in response to receiving the event notification, determining, by the server nub, whether the stopping point corresponds to an extraneous breakpoint; and
    if the stopping point is determined to correspond to an extraneous breakpoint, dismissing the breakpoint.

7. The computer-implemented method of claim 6, wherein the stopping points correspond to coordinates in the program.

8. The computer-implemented method of claim 7, wherein the coordinates represent locations in the source code associated with the program.

* * * * *